Aug. 26, 1941.   V. H. MEYER   2,253,640
TRIMMING MACHINE
Original Filed Nov. 1, 1937   2 Sheets-Sheet 1

INVENTOR
Vernon H. Meyer
By his attorney

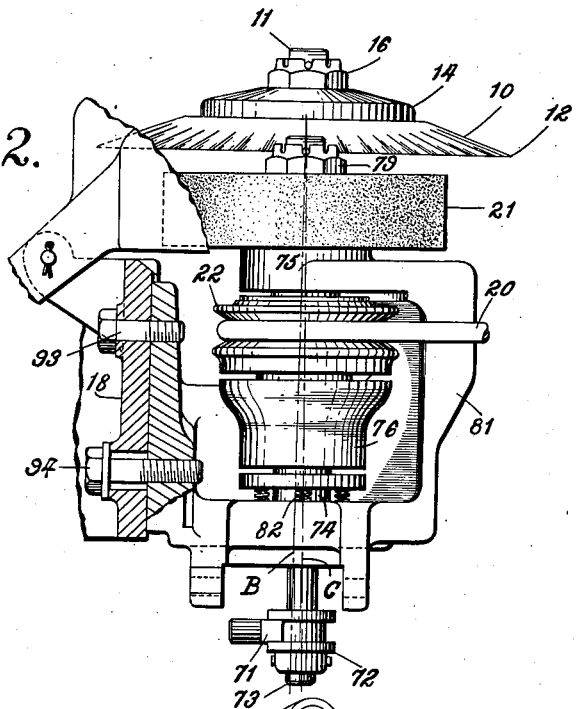
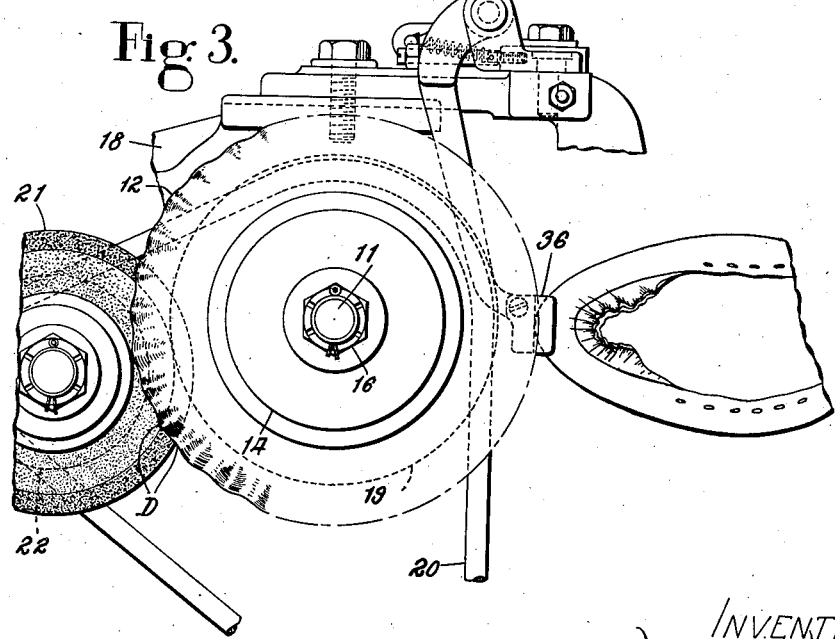

Patented Aug. 26, 1941

2,253,640

UNITED STATES PATENT OFFICE 2,253,640

TRIMMING MACHINE

Vernon H. Meyer, Beverly, Mass., assignor to United Shoe Machinery Corporation, Borough of Flemington, N. J., a corporation of New Jersey Original application November 1, 1937, Serial No. 172,115. Divided and this application July 26, 1939, Serial No. 286,591

2 Claims. (Cl. 51—247)

This invention relates to trimming machines of the type in which a rotary saucer-shaped cutter is used to sever lumps on the bottoms of lasted shoes as at the toe end where the overlasted margin of the upper is crimped and pleated and secured to the insole with lasting cement. A machine of that type is more fully illustrated and described in my co-pending application Ser. No. 172,115, filed November 1, 1937, of which this present application is a division that deals particularly with conditions that affect the manner in which the trimming cutter should be sharpened.

In the illustrated machine an abrading wheel for sharpening the cutter is arranged to be brought into operation manually at a point where it will not interfere with any of the instrumentalities used for trimming purposes, and the bearing member in which the shaft or spindle of the abrading wheel is journaled has provisions for regulating the cooperative relation between the abrading wheel and the cutter according to whether the rim of the cutter should be flat for flat trimming or concave for convex trimming.

A novel feature provided by the illustrated construction consists in a combination comprising a double-duty transmission belt one portion of which is arranged to run on a pulley on the spindle of the abrading wheel while another portion runs on a pulley on the spindle that carries the cutter, and provision for altering the angular relation of the axes of the spindles according to dissimilar grinding requirements.

Referring to the drawings,

Fig. 2 is a rear elevation, partly in section, of such assemblage;

Fig. 3 is a top plan view of the same assemblage but includes also a toe-gage and the forepart of a lasted shoe about to be fed to the cutter with movement from right to left.

Figure 1:
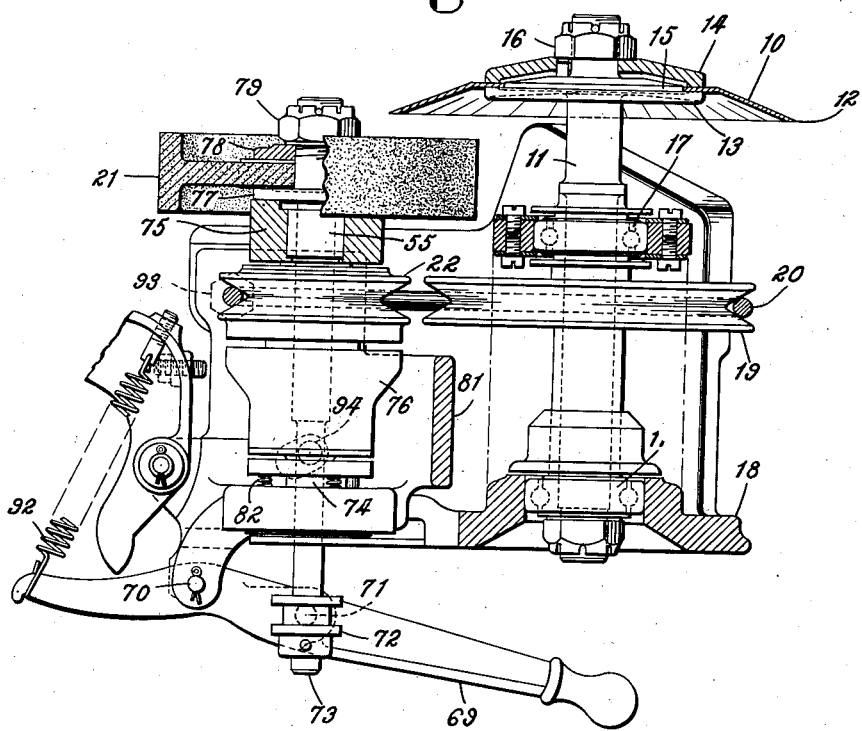
Fig. 1 is a side elevation, partly in section, of a cutter-and-grinder assemblage as organized in a trimming machine of the type under consideration.

As shown best in Fig. 1, the trimming cutter 10 is essentially a saucer-shaped disk or annulus of pressed sheet steel from which a circular central portion is punched out to provide for locating the cutter in concentric relation to a vertical rotary spindle 11 by which it is carried. The outer margin of the cutter is frusto-conical and its rim is ground to provide an endless cutting edge 12 that lies all in one plane at right angles to the axis of rotation, but preferably this margin is provided with shallow, radially extending corrugations impressed into it, to the end that the cutting edge will be slightly wavy instead of strictly circular. The cutter is mounted to place its cutting edge at the bottom, that is, in a plane below the level of its inner margin, to the end that the cavity within the boundary of the cutting edge will provide clearance for a toe-gage 36 that travels under the cutter toward and from its axis.

A flange 13 formed on or affixed to the spindle 11 provides an annular seat against which the inner margin of the cutter may be clamped by a detachable clamping disk 14, the flange 13 being provided with a circular concentric shoulder 15 adapted to fit closely in the central opening in the cutter and thereby maintain the cutter in concentric relation to the spindle 11. The upper end of the spindle is provided with a screw-thread on which a nut 16 is screwed to set up the clamping disk 14 tightly against the cutter.

During periods of use, the cutter will be rotated continuously not only for trimming but also for sharpening its cutting edge, except that provision is made for reversing its direction of rotation to utilize sharp portions of the wavy cutting edge when other portions become dull. Preferably the spindle 11 is mounted in ball-bearings 17, 17 located in sockets formed in the head portion 18 of a frame, the upper bearing being constructed and mounted to serve also as a thrust bearing. A receiving pulley 19 affixed to the spindle 11 is driven by a belt 20 that serves also, under certain conditions of use, to drive a rotary abrading wheel 21 by which the cutting edge 12 may be sharpened without interrupting its rotation. Accordingly, the belt 20 passes around a pulley 22 that is normally free to rotate without imparting rotation to the abrading wheel.

The abrading wheel 21 (Fig. 1) underlies a rear segment of the cutter 10 and normally remains out of contact therewith and out of connection wtih the driving means by which it may be rotated to sharpen the cutter, but is so mounted in relation to the driving means that when lifted manually to its operative position, a driving connection is established incidentally thereto. The lifting member is a hand-lever 69 mounted on a fulcrum-pin 70. This lever carries a swiveled lug 71 that projects into a circumferential groove between two flanges of a collar 72 affixed, as by a pin, to the lower end of a spindle 73. The abrading wheel is secured to the spindle by a flange 77, a clamping disk 78 and a nut 79.

In Fig. 2 the broken line B represents the axis of the cutter, and the broken line C represents the axis of the abrading wheel 21. These axes, as they are related in this view, are not quite parallel, their angle of divergence being about one or two degrees which is sufficient to restrict the contact of the abrading wheel with the cutter to a short segment as at D (Fig. 3). Otherwise viewed, the axis of the abrading wheel may lie in a plane parallel with the axis of the cutter as represented in Fig. 1, in which relation the abrading wheel will generate a flat surface on the rim at the bottom of the cutter. This result will be satisfactory when the cutter is used to trim with a flat cut from beginning to end, since the toe of a shoe will not have to enter the cavity in the cutter to obtain a flat cut.

On the other hand, when the toe is led into the cavity to develop convexity of the trimming cut as hereinbefore explained, the bottom surface or rim of the cutter should not be strictly flat but should have a slight factor of concavity in the surface generated by the abrading wheel. Accordingly, the abrading assemblage is mounted to provide for tilting its axis C toward the rear (that is, away from the trimming segment) far enough to satisfy this requirement. For this purpose the bracket 81 for supporting the abrading assemblage is mounted on a screw 93 the axis of which intersects that portion of the belt 20 that extends around the rear of the pulley 22. See Fig. 1. This screw extends through a hole in the frame 18 (Fig. 2) and is screwed into the bracket 81. The frame and the bracket are additionally connected by a clamping screw 94 that extends through an oversize hole in the frame and is screwed into the bracket. When the screws 93 and 94 are both loosened, the bracket may be tilted about the axis of the former for purposes of adjustment within the limits of the oversize hole. The intersecting relation between this axis and the portion of the belt wrapped around a segment of the pulley 22 avoids altering the tension of the belt when the bracket 81 is adjusted as described.

Figure 4:
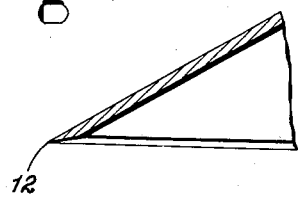
Fig. 4 is a sectional view of a portion of a trimming cutter that has been sharpened by generating a concave annular surface at its lower margin.

When the bracket 81 is in the position of adjustment represented in Fig. 1, the abrading wheel will generate a flat face at the rim of the cutter 10, but to generate a concave surface as represented in Fig. 4, the bracket 81 should be tipped in a counter-clockwise direction. This will cause a segment of the abrading wheel to enter the cavity in the cutter, and the resulting surface generated by the abrading wheel will be a concave bevel. The degree of concavity is regulatable according to the extent to which the bracket 81 is tipped in the course of adjusting it.

Since all the parts of the abrading mechanism are carried by the bracket 81, their relations one to another are not disturbed by adjustments of this kind, and since the axis of these adjusting movements intersects the rear segment of the belt 20, such adjustments do not disturb the operating relation of the belt and the pulley 22.

The spindle 73 of the abrading wheel is journaled in two bearing sleeves 55 and 74. The sleeve 55 is pressed into the upper portion 75 of the bracket 81, but the sleeve 74 is arranged in the lower part of the same bracket with provision for a slight axial movement to satisfy the requirements of a clutch mechanism more fully illustrated and described in a co-pending application, Serial No. 171,179, filed October 26, 1937, in the name of Sandberg. The driven member 76 of the clutch has a spline connection with the spindle 73 and the organization is such that when the rotary unit comprising the abrading wheel and its spindle is retracted from the cutter 10 by the force of gravity the flange 77 becomes seated on the portion 75 and the driven member of the clutch is disengaged from the driving member 22. The driving member is therefore free to rotate without imparting rotation to the abrading wheel.

On the other hand, when the handle 69 of the lifting lever is raised, it shifts the abrading wheel into engagement with the rim of the cutter 10, and thereby permits the driven member 76 to be raised into engagement with the driving member 22 by the sleeve 74 and a plurality of compression springs 82 (Figs. 1 and 2) that exert lifting force against a flange of the sleeve. This force is effective to establish operative engagement of the clutch members without arresting the travel of the abrading wheel to the cutter. A tension spring 92 is connected to the rear end of the lifting lever 69 to insure the return of the latter to its initial position when the use of the abrading wheel is discontinued. The lever 69 is supported by the adjustable bracket 81 to which it is connected by the fulcrum-pin 70.

Having described my invention, what I claim as new and desire to secure by Letters Patent of the United States is:

1. A trimming machine comprising two spindles each provided with a pulley, a transmission belt arranged to run on both of said pulleys to drive them, a cutting disk and an abrading member carried by said spindles respectively, said abrading member being arranged to generate an annular cutting edge on the rim of said disk, a pivot the axis of which intersects a portion of said belt wrapped around a segment of one of said pulleys, and relatively adjustable bearing members in which said spindles are journaled, one of said bearing members being mounted on said pivot and adjustable about its axis to regulate the character of the surface generated on said rim by said abrading member.

2. A trimming machine comprising two spindles each provided with a pulley, a transmission belt arranged to run on both of said pulleys to drive them, a cutting disk carried by one of said spindles, an abrading member carried by the other one of said spindles and arranged to generate a cutting edge on the rim of said disk, a pivot the axis of which intersects a portion of said belt wrapped around a segment of said pulley of said abrading member, and an adjustable bearing member in which the spindle of said abrading member is journaled, said bearing member being mounted on said pivot member and adjustable about its axis to regulate the angular relation of the axes of said spindles and the character of the surface generated on said rim by said abrading member.

VERNON H. MEYER.